(No Model.) 3 Sheets—Sheet 1.

G. H. GILLETTE.
BOTTLE STOPPER.

No. 493,701. Patented Mar. 21, 1893.

WITNESSES:
Edward Thorpe
A. R. Dunne

INVENTOR
George H. Gillette
BY
Henry F. Parker.
ATTORNEY (No Model.)  
G. H. GILLETTE.  
BOTTLE STOPPER.

3 Sheets—Sheet 2.

No. 493,701.  Patented Mar. 21, 1893.

WITNESSES:  
Edward Thorpe  
A. R. Dunne

INVENTOR  
George H. Gillette  
BY  
Henry F. Parker  
ATTORNEY (No Model.) 3 Sheets—Sheet 3.
G. H. GILLETTE.
BOTTLE STOPPER.
No. 493,701. Patented Mar. 21, 1893.
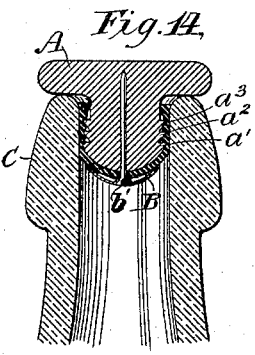
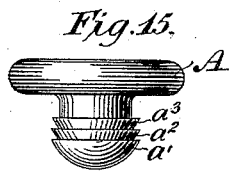
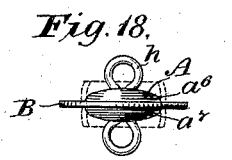
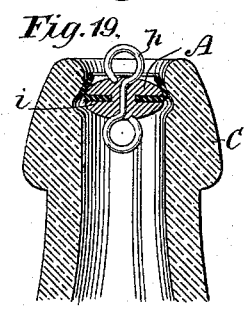
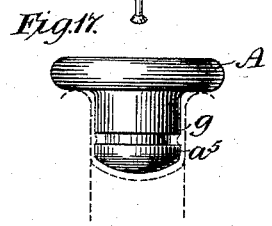
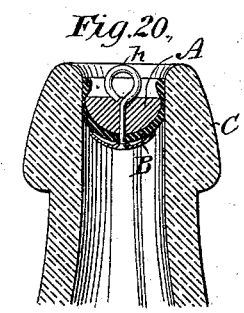
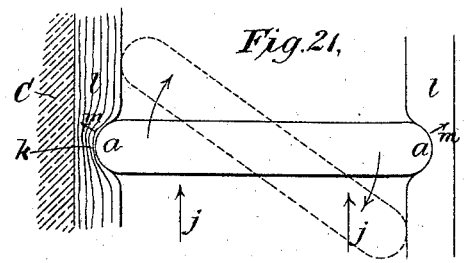
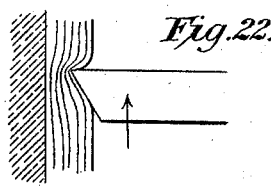
WITNESSES:
Edward Thorpe
Agnes R. Dunne
INVENTOR
George H. Gillette
BY
Henry F. Parker
ATTORNEY

UNITED STATES PATENT OFFICE.

GEORGE H. GILLETTE, OF NEW YORK, N. Y.

BOTTLE-STOPPER.

SPECIFICATION forming part of Letters Patent No. 493,701, dated March 21, 1893.

Application filed April 21, 1892. Serial No. 430,146. (No model.)

*To all whom it may concern:*

Be it known that I, GEORGE H. GILLETTE, a citizen of the United States, residing at the city, county, and State of New York, have invented certain new and useful Improvements in Bottle-Stoppers, of which the following is a specification.

My invention relates to self-retaining stoppers for bottles, or those wherein longitudinal retention is effected by lateral expansion.

The object of my invention is to supply a stopper that may be readily inserted or withdrawn without the use of special instruments, and moreover, to provide a stopper that may be used a repeated number of times before being discarded; and further, to provide a stopper or seal in which india rubber may be used at moderate cost of manufacture.

My invention consists in a bottle stopper provided with a bulbous core having means for limiting its insertion, and an india rubber or other elastic disk so attached to the core as to become interposed with upturned margins when inserted to the limit provided; which interposed elastic covering forms a retaining medium when the axis of the stopper is vertical, but may be readily displaced by the tilting of the stopper sidewise; and also the combination of such stopper with a bottle provided with a circumferentially grooved throat; and also in certain details of construction hereinafter described and claimed.

I have herein illustrated a variety of forms embodying the principle of my invention, which may be also carried out by other obvious modifications than those shown.

Figure 1:
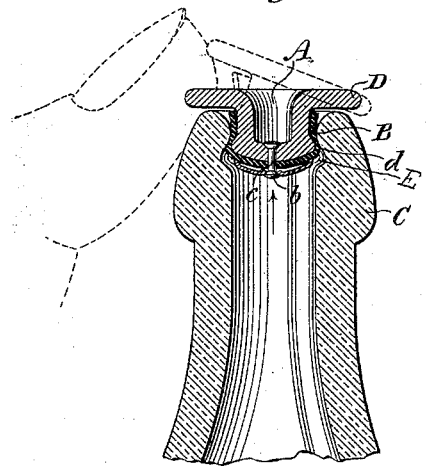
Figure 2:
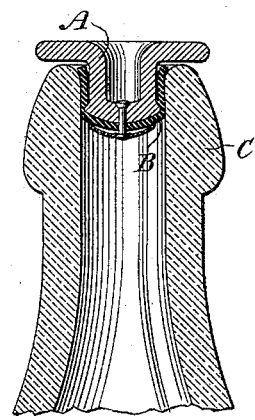
Figure 3:
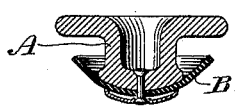
Figure 4:
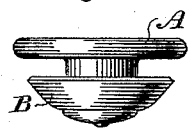
Figure 6:
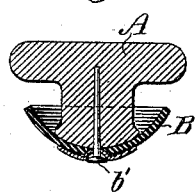
Figure 7:
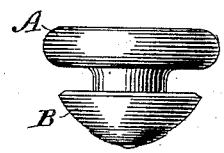
Figure 9:
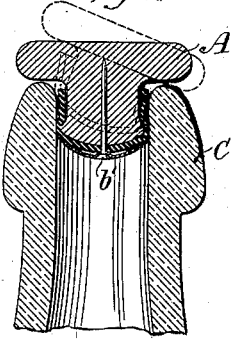
Figure 8:
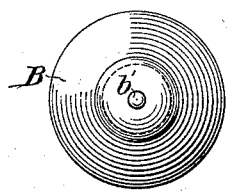
Figure 10:
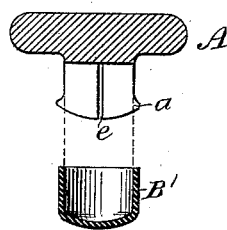

Referring to the accompanying drawings: Figure 1, represents in sectional elevation a metallic core stopper applied to a bottle circumferentially grooved within to form a receptacle for the seal. Fig. 2, represents in sectional elevation a similar stopper in its application to a bottle having the commonly used cylindrical aperture. Fig. 3, is a sectional view showing the stopper in Fig. 1, removed; Fig. 4, a side elevation of the same, and Fig. 5, a perspective view showing the external appearance of the stopper when inserted. Fig. 6, is a sectional view of a similar stopper having its core made of wood or other fibrous material. Fig. 7, a side elevation of Fig. 6; and Fig. 8, an inverted plan view of the core in Fig. 6. Fig. 9, illustrates the application of the stopper to a strictured bottle neck. Fig. 10, is a sectional view, and Fig. 11, an inverted plan view, showing a split or divided core which is thereby rendered elastic to a limited degree, and Fig. 10, also illustrates a cup-shaped elastic covering adapted to this or any of the forms. Fig. 12, is a sectional view of a split core, showing the elastic washer attached in the same manner as in Fig. 6; and Fig. 13, an inverted plan view of Fig. 12, with the elastic washer removed. Fig. 14, represents in sectional elevation, a stopper wherein the core is provided with a plurality of circumferential ribs, and showing its application to a cylindrically threaded bottle. Fig. 15, is a side elevation of the core shown in Fig. 14. Fig. 16, is a side elevation of the core having projections or spurs in lieu of a continuous circumferential rib or ribs; the elastic washer and other parts appearing as separated. Fig. 17, is a side elevation, showing a core grooved circumferentially, leaving maximum diameters thereof above and below the groove; the dotted lines indicating the elastic covering at the position of insertion. Fig. 18, is an edge view showing a further modified form of my invention wherein the cap or flange shown in the preceding figures, is dispensed with and the stopper moreover made reversible. Fig. 19, indicates the same in its position of insertion. Fig. 20, illustrates a further modification also dispensing with the flange. Fig. 21, is a diagram illustrating the principle of the invention; and Fig. 22, a modified illustration of Fig. 21.

Figure 5:
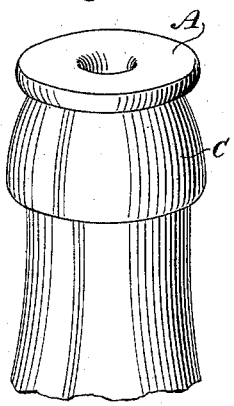

Referring to Figs. 1, to 5, inclusive, A, represents the core of suitable material. I have illustrated a cast core, although the desired form may be otherwise produced, as for example by cutting and pressing the same from sheet metal. B, is an elastic covering such as india rubber, which surrounds the core when inserted into the bottle C. *a*, represents the circumferential enlargement of the core or maximum diameter thereof, similarly designated throughout the drawings. The elastic covering B, may be constructed in any suitable form, either cut from a sheet of the material, or molded into a cup or concave shape (as in Fig. 10), or of tubular form. The covering B, may be attached to the core A, by any suitable means. I illustrate a rivet *b*, and metallic washer *c*, which is convexed more than the convex surface of the core, in order that the edges of the washer *c*, may principally bind and hold the covering B, in place. D, is the flange of the stopper by which it may be removed by the hand.

My improved stopper of whatever form herein illustrated, or of other obvious modifications thereof, is adapted for use in a bottle having a receptacle formed of a circumferential groove such as E, in Fig. 1, and also for general use in such form of bottle, for example, as illustrated in Fig. 2.

Referring to Figs. 6, to 17, inclusive, the core of the stopper is represented as of wood or other fibrous material, the fiber running longitudinally as appears in section. The attachment of the elastic covering is substantially the same as in Fig. 1; the nail *b′*, being substituted for the rivet *b*. Where a wood core and flange is used, the same may be japanned in order to prevent injury by moisture.

Figure 11:
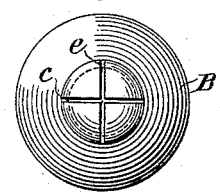
Figure 12:
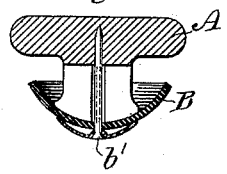

In Figs. 10, and 11, the core A, is partially split or divided by incisions *e*, as a most convenient manner of acquiring partial or limited elasticity thereto. When used in the grooved form of bottle shown in Fig. 1, the elastic core may be made to expand and stretch the rubber outwardly to fill or nearly fill the groove *d*.

Figure 13:
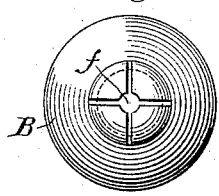

In Figs. 12, and 13, I illustrate the provision of an opening *f*, through the center of the elastic core, suitable for the passage of the nail *b′*, into the solid or upper part of the core without interfering with the contraction of the split part thereof. B′, indicates a thimble of the elastic material molded into tubular form adapted to be stretched over the core A, in Fig. 10, or the solid core represented in any of the other figures.

In Figs. 14, and 15, $a′$, $a^2$, $a^3$, indicate plural circumferential ridges upon the core. In this modification, by inclining the margins of the ridges upward, they engage upon the elastic covering so as to oppose the upward pressure exerted by the gases in the bottle.

In Fig. 16, the spurs $a^4$, serve a similar function of engaging with the elastic material as do the circumferential ribs.

In Fig. 17, the groove *g*, leaves a rib $a^5$, functionally similar to the ribs shown in the other views.

In Figs. 18, and 19, there are two ribs $a^6$, $a^7$, on the core A, one above the elastic disk B, and the other below, and the flange D, is omitted. There are loops *h*, which serve to effect the removal of the stopper by a suitable instrument, when inserted. As indicated in Fig. 18, by dotted lines, the elastic material B, which is made in the form of a flat washer, may be folded about either rib $a^6$, or $a^7$, according to which side is up when inserted into the bottle as in Fig. 19. The seal thus formed is especially adapted to an interiorly grooved bottle neck. The core A, (Fig. 19) is preferably cast of a single piece of white metal or other material, and the wire loop *h*, cast therein. The elastic washer B, is stretched into the groove *i*, and the groove afterward tightened upon the rubber by a blow.

In Fig. 20, the core piece having a single rib, but minus the flange, is illustrated, and this modification is designed to be employed in a similar manner as are the stoppers illustrated in the preceding figures. When the elastic covering B, is wrapper about the core A, an elastic stopper is formed having its diameter in excess of the internal diameter of the neck of the bottle for which it is intended. That is to say, the maximum diameter of the core is very nearly equal to the minimum internal diameter of the bottle neck, and the thickness of the elastic covering is more than enough to supplement the difference between the said diameters, making the whole diameter of the stopper sufficiently the greater to effect the desired lateral compression and longitudinal retention. When the core itself is made elastic to a limited degree, as in Figs. 10, to 13, the same may be constructed of an equal or a greater diameter than the minimum interior of the bottle neck, and the range of expansion of the stopper will be increased diametrically.

In operation, the stopper is inserted by hand by a moderate longitudinal pressure, the accumulation or buckling of the elastic covering B, ahead of the rib *a*, being prevented by reason of its fastening below said rib by the plate *c*, from the margin of which the said covering is stretched by its contact with the aperture of the bottle. When in position, the stopper is retained firmly against outward thrusts in the line of its axis by reason of the tendency of the elastic material B, to accumulate above the rib *a*, and by reason of the natural tendency of the elastic material employed (india-rubber) to adhere to the glass material of the bottle when so accumulated or crowded therein. However, as indicated in Fig. 1, the flanged stopper may be readily removed by the hand by tilting it laterally, which movement destroys the cylindrical coincidence of the elastic surface of the stopper with the interior surface of the bottle.

The principle of the invention is illustrated in Figs. 21, 22, wherein the elastic material is compressed at *k*, to a lesser thickness than at *l*. Thus when longitudinal pressure is exerted in the direction of the arrows *j, j*, the elastic material has a tendency to accumulate at *l, l*, owing to its adherence to the walls of the bottle neck C, as aforesaid. An angular transmission of pressure is thus exerted in the direction of the arrows *m, m*, acting similarly as would the spring of an inverted arch, in binding the stopper into the bottle.

I prefer to use very thin rubber as an elastic covering, of say one-thirty-second of an inch in thickness.

Having thus fully described my invention, what I claim, and desire to secure by Letters Patent, is—

1. A bottle stopper consisting in a core having a bulbous lower extremity, a reduced neck, and an india-rubber or other elastic disk attached to the core below the bulb, and means for limiting the insertion of the stopper whereby at its extreme entrance said disk is interposed with upturned margins between the bulb and the throat of the bottle, substantially as described.

2. The combination of a bottle stopper composed of a core having a bulbous lower extremity, a reduced neck, an india-rubber or other elastic disk attached to the core below the bulb, and means for limiting the insertion of the stopper whereby at its extreme entrance said disk is interposed with upturned margins between the bulb and the throat of the bottle, with a bottle circumferentially grooved within its throat for the reception of such bulb, and the upturned disk, substantially as described.

3. In a bottle stopper, the combination of a core having a bulbous lower extremity, a reduced neck, and an india rubber or other elastic disk attached to the core below the bulb, which when inserted is interposed with upturned margins between the bulb and the throat of the bottle, and a rigid disk attached to the core concaved to clamp at its margins upon the said india rubber disk in the manner described.

GEORGE H. GILLETTE.

Witnesses:
EDW. J. DE LONG,
H. F. PARKER.